United States Patent

[11] 3,599,094

| [72] | Inventor | Vernon R. Pring<br>233 W. Jefferson, Los Angeles, Calif. 90007 |
|---|---|---|
| [21] | Appl. No. | 773,686 |
| [22] | Filed | Sept. 20, 1968 |
| [45] | Patented | Aug. 10, 1971 |

[54] TESTER FOR STORAGE BATTERIES AND VOLTAGE REGULATORS INCLUDING DIFFERENTIAL VOLTAGE INDICATOR AND NULL ADJUSTING MEANS
12 Claims, 4 Drawing Figs.

| [52] | U.S. Cl. | 324/29.5 |
|---|---|---|
| [51] | Int. Cl. | G01n 27/46 |
| [50] | Field of Search | 324/65 P, 72.5, 29.5, 131; 136/182.31; 340/249 |

[56] References Cited
UNITED STATES PATENTS

| 1,426,868 | 8/1922 | Haskins | 324/29.5 |
|---|---|---|---|
| 1,650,779 | 11/1927 | Williams | 324/72.5 UX |
| 1,954,435 | 4/1934 | Vail et al. | 324/29.5 UX |
| 2,076,639 | 4/1937 | Heyer | 324/29.5 X |
| 2,885,648 | 5/1959 | King | 324/65 P |
| 2,904,748 | 9/1959 | Christie et al. | 324/29.5 |
| 2,922,104 | 1/1960 | Godshalk et al. | 324/29.5 |
| 2,922,948 | 1/1960 | Washburn | 324/29.5 |
| 3,060,374 | 10/1962 | Strain | 324/29.5 |
| 3,310,739 | 3/1967 | Medlar | 324/131 X |
| 3,349,322 | 10/1967 | Lowe | 324/29.5 |

*Primary Examiner* — Gerard R. Strecker
*Attorney* — Sellers and Brace

ABSTRACT: Apparatus for checking the go no-go condition of a storage battery under load and the proper setting of a vehicle voltage regulator. The tester indicates which of two sections of a battery is defective by indicating whether either section is unable to produce an acceptable voltage output under an appropriate load. The tester makes use of probe means insertable into the battery electrolyte and made of a material not subject to galvanic action. The tester includes various adjustable means including manufacturing tolerance compensators, selectors for loading batteries of different ratings and voltages with appropriate loads as well as means for changing the range of voltage indicator means to permit its use to check the operative condition of the battery and alternatively to adjust a vehicle voltage regulator as part of the battery-checking operations.

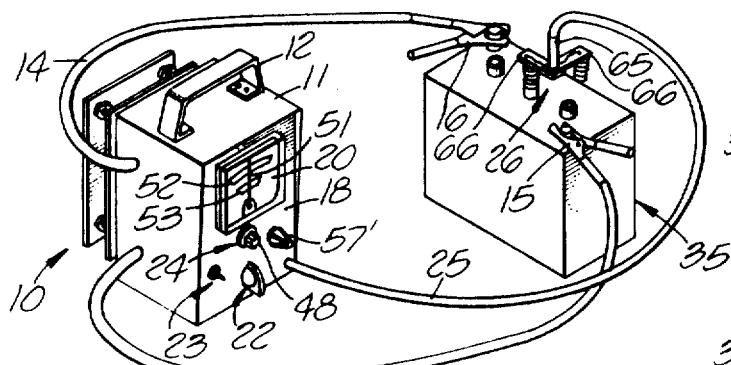
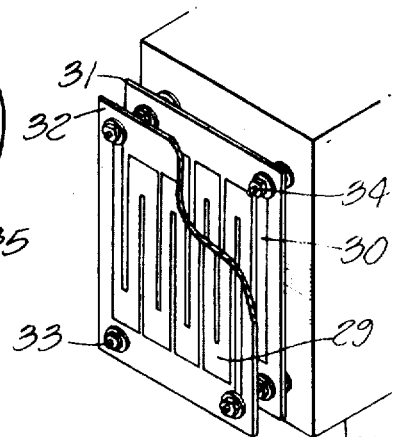
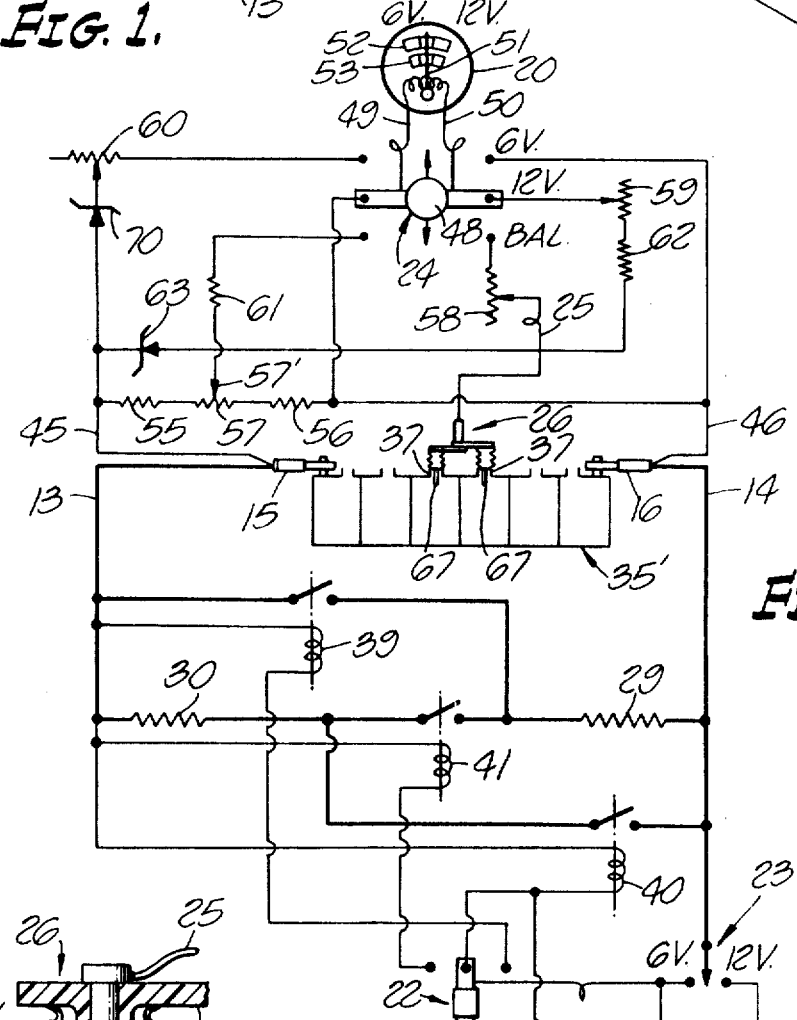
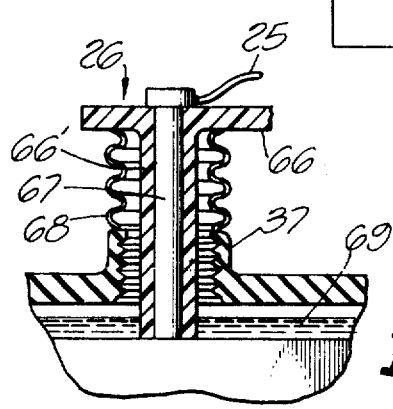
INVENTOR
VERNON R. PRING
BY
ATTORNEYS

TESTER FOR STORAGE BATTERIES AND VOLTAGE REGULATORS INCLUDING DIFFERENTIAL VOLTAGE INDICATOR AND NULL ADJUSTING MEANS

This invention relates to battery checking equipment and, more particularly, to an improved battery tester for quickly determining the go no-go condition of the battery and, additionally, to determine the proper setting of a vehicle voltage regulator.

A wide variety of equipment and proposals have been provided heretofore for determining the operative condition of storage batteries. However, such previous devices are subject to various shortcomings and deficiencies obviated by the present invention. A particularly serious defect of prior testers is the lack of satisfactory provision for testing a storage battery of the type encased in a molded shell or having its cell connectors embedded in potting compound and inaccessible to the conducting probes of test equipment. The connectors of the former are inaccessible and those of the latter type can be reached only by testers equipped with sharply pointed probes capable of penetrating the potting compound and making contact with the connectors. It is often difficult to locate the connectors without making repeated attempts or to obtain a satisfactory electrical contact therewith. It not infrequently happens that serious damage to the battery results from attempts to locate the connectors and, on occasion, the probe penetrates into the cell cavity.

Prior to this invention it has also been common practice to test individual cells for operativeness using testing equipment having this capability. However, this procedure is costly, time consuming and of little or no value to the battery owner since, if any cell is deficient or inoperative, the battery is undependable and a liability to the owner. Such information may be of value to battery rebuilders or central station overhaul operators but not to the individual operator of a vehicle, truck, plane, boat or other battery-using equipment.

To meet such needs and to avoid the numerous shortcomings and disadvantages of prior testing equipment there is provided by this invention a greatly simplified, inexpensive and highly reliable, unitary, portable tester requiring a minimum of instruction and skill on the part of the operator for quickly determining the go no-go capability of the battery. The tester is equally suitable for use with batteries of widely differing voltages and load ratings and includes a selector switch for expanding the upper end of the scale of the voltage indicator for use in checking the operating condition of the system voltage regulator.

In checking a battery, the equipment compares the voltages developed across the two halves of a battery under load thereby to determine whether the produced voltages are within manufacturers' specifications. This operation is performed while the battery is under a selected suitable load and with the tester probe unit inserted in the electrolyte of other than an end cell. Preferably, the midcell or cells of the battery are employed and the voltage across one-half of the battery is compared with that across the other half. If the voltage difference as determined by differential indicator means exceeds an acceptable value, it is manifest that a cell in the portion producing the lower voltage is defective and unacceptable for service.

The invention probe contains a pair of electrodes immune to galvanic action and quickly and readily adjustable to accommodate different battery designs and sizes and so arranged that a single probe may be inserted into a central cell having an odd number of cells or adjustable to a position in which the two probes can be inserted into adjacent cells of a battery having an even number of cells.

It is therefore a primary object of the present invention to provide an improved, simplified tester for quickly and accurately determining the operative condition of a storage battery or a voltage regulator.

Another object of the invention is the provision of a lightweight, readily portable, self-contained battery tester for quickly determining the go no-go condition of various sizes of storage batteries under appropriate load conditions.

Another object of the invention is the provision of an improved battery tester for batteries having either an odd or an even number of cells and in which the only available terminals are the positive and negative terminals.

Another object of the invention is the provision of an improved battery tester equipped with an electrolyte-contacting probe usable repeatedly without risk of galvanic action.

Another object of the invention is the provision of an improved probe for use in testing storage batteries and having an electrolyte-contacting component immune to galvanic action.

Another object of the invention is the provision of testing equipment for voltage regulators and storage batteries under load conditions and having provision for balancing the voltage produced across one portion of a battery with that produced across another portion to determine whether either section is performing within acceptable standards.

These and other more specific objects will appear upon reading the following specification and claims and upon considering in connection therewith the attached drawing to which they relate.

Referring now to the drawing in which a preferred embodiment of the invention is illustrated.

FIG. 1 is a perspective view showing a preferred embodiment of the invention tester connected to a 6-volt battery;

FIG. 2 is a fragmentary perspective view from the rear of FIG. 1 showing the load elements;

FIG. 3 is a schematic view of the tester connected to a 12-volt battery; and

FIG. 4 is a fragmentary view in longitudinal section through one of the test probes while inserted into a battery cell.

Referring more particularly to FIG. 1, there is shown a preferred embodiment of the invention tester, designated generally 10, having a main housing 11, provided with a carrying handle 12 and a pair of flexible heavy duty cables 13, 14 equipped at their ends with strong spring-biased clamps 15, 16 for attachment to the terminals of the battery to be tested. Tester 10 has a front control panel 18 provided with any suitable differential voltage indicator means 20, a load selector switch 22, a master or timer switch 23, and a control switch 24 having several functions to be explained presently. A third flexible cable 25 extends from the casing and is provided at its outer end with a probe unit 26 forming an important feature of the invention.

As herein shown, a pair of heavy duty load resistors 29, 30 are mounted on panels of insulating material 31, 32 rigidly secured to a rear face of casing 11 by strong copper bolts 33, 34 and serving additionally as conductors for the load current. As is apparent from FIGS. 1 and 2, the load resistors are located in vertical air flues to facilitate dissipation of heat to the atmosphere. While not so shown, it will be understood that a protective screen or grillwork may be and preferably is mounted about the load resistors to safeguard against damage or risk of fire or injury to personnel.

As shown in FIG. 1, the tester is connected to a typical 6-volt storage battery 35 having an odd number of cells. In this case, only one electrode of probe 26 is used, the other probe extending downwardly along the sidewall of the battery. If the battery has an even number of cells then the probe electrodes are inserted through the respective charging openings of a pair of adjacent cells, as will be described in greater detail in connection with the 12-volt battery shown in FIG. 3.

Referring now to FIG. 3, there is shown a typical schematic of the invention tester with the probes 26 inserted into the center cells through the charging ports 37 of a 12-volt storage battery 35'. The portion of the schematic above the battery comprises the checking and condition indicating portion of the circuit whereas the portion below the battery represents the load and load control components used to simulate different environmental loads typically applied to batteries of different capacities. The two principal load resistors 29 and 30 are respectively controlled by heavy duty relay switches 39 and 40. For example, closing relay 41 imposes a low load on the battery under test by placing resistors 29 and 30 in series, whereas closing relay 40 places medium load resistor 30 in circuit with the battery. When it is desired to place a heavy load on the battery, relays 39 and 40 are closed, placing resistors 29 and 30 in parallel across the battery. A third resistor 42 is added to the relay control circuit for the load resistors to avoid overloading the relays when testing a 12-volt battery.

As is readily apparent from FIG. 3, load control switch 22 is shiftable between three positions depending on the size of the load to be imposed upon the battery under test. If the switch occupies the left-hand position, relay 41 is energized to close the circuit through resistors 29 and 30, whereas if the switch is in its midposition, relay 40 is energized to utilize resistor 30 as the battery load. If the switch is in its right-hand position, relays 39 and 40 are closed thereby utilizing both of load resistors 29 and 30 in parallel.

The condition indicator circuit occupying the upper half of the schematic has its terminals 45, 46 connected to clamps 15 and 16 as well as to a voltage divider network, probe unit 26 and the differential voltage indicator 20. This circuit also includes a control switch 24. This switch, like load control switch 22, is shiftable between three different positions by a control knob 48. Each of the contactors movable with knob 48 is connected to one of the flexible leads 49, 50 connected to indicator 20. If the same voltage is developed across each half of the battery, indicator needle 51 occupies a central or null position centrally of scales 52, 53. However, if the voltage developed across either half of the battery is higher, this condition determines the direction and magnitude of needle deflection from its null position. Larger scale 52 is an expanded voltage scale used to show the operating condition of a voltage regulator whereas the smaller scale 53 is used to show the go no-go condition of a battery.

The voltage divider network includes a pair of protective resistors 55, 56 in series with the opposite ends of a variable resistor 57 employed to adjust the indicator needle 51 to its null position when the tester is connected across the battery terminals under no load conditions. Tolerance compensator resistor 58 is preferably present in the circuit for convenience in adjusting the voltage divider circuit at the factory. A second factory compensator resistor 59 is desirably employed in the sensitivity or voltage expander circuit for 12-volt batteries and a similar variable resistor 60 is present in the 6-volt circuit. Each of these expander circuits is equipped with a suitable zener diode having an appropriate voltage rating which must be exceeded before needle 51 of indicator 20 becomes responsive. By this means, the full range of scale 52 can be utilized to measure a small voltage difference.

By way of example, diode 63 is type IN 756 whereas diode 70 is type IN 750. Suitable values for each of the resistors for use in the 6- and 12-volt tester circuits are as follows:

| | |
|---|---|
| R-55 | 100 ohms. |
| R-56 | 100 ohms. |
| R-57 | 50 ohms. |
| R-58 | 5 k. |
| R-59 | 5 k. |
| R-60 | 10 k. |
| R-61 | 680 ohms. |
| R-62 | 12 k. |

When indicator control switch 24 is in its upper position, the 6-volt expander circuit is activated, whereas when the switch is in its intermediate or middle position, the 12-volt expander of sensitivity circuit is activated. When switch 24 is in its lowermost position, the voltage divider circuit for probe 26 is activated.

Hand held probe 26 is provided with a suitable handle 65 to the other end of which a pair of arms 66 are connected for pivotal movement about the handle axis, any suitable friction clutch means being interposed between the arms and handle 65 to hold the arms in any desired adjusted position. As is best shown in FIG. 4, the outer end of each arm 65 is provided with a tubular boss 66' snugly fitting a conductive electrode 67. Boss 66' is preferably surrounded by a shock-absorbing protective shroud 68 of highly flexible, resilient material as, for example, a rubber bellows, the upper end of this shroud being bonded or otherwise suitably secured to arm 65. The relaxed length of the bellows is at least as long as the electrode and it is sized to seat against the upper edge of the tubular skirt 37 surrounding the electrolyte charging port of a battery cell. Accordingly, when the electrode is inserted through this port, the bellows bears against the upper end of skirt 37 and readily collapses as the electrode is inserted into electrolyte 69. For this reason, the shroud itself never contacts the battery electrolyte except when shifted laterally against the side of tube 66 after the probe has been withdrawn from the battery. When the probe is withdrawn from the cell, bellows 68 expands and surrounds the entire full length of the electrode and prevents the highly corrosive film of electrolyte from contacting the operator, his clothing or any other object.

An important feature of the invention is the use of a material for electrode 67 not subject to galvanic action when wetted with the electrolyte. A suitable material found highly satisfactory is carbon of the type commonly used for the center electrode of dry batteries. It is found that this material is immune to attack by battery electrolyte and does not produce spurious electrical voltages.

The operation of the described tester will be quite evident from the foregoing detailed description. Let it be assumed that the user wishes to check the condition and serviceability of the 12-volt battery 35' shown in FIG. 3 and understood as connected in the ignition circuit of a motor vehicle. The operator carries tester 10 to the vehicle and connects clamps 15, 16 to the proper positive and negative terminals of the battery and inserts electrodes 67 of probe 26 downwardly through the charging openings 37 of the two central cells in the manner indicated in FIG. 3. Before proceeding to test the battery under load conditions, the operator adjusts control 57' in either direction as necessary to place needle 51 of voltage indicator 20 in its null or zero position for that particular battery. A load test of the battery is then made by applying a suitable load and noting whether the needle is deflected sufficiently to require recharging of the battery before proceeding with the test. After recharging the battery, if necessary, the operator proceeds with the battery balance test by first shifting selector switch knob 48 to its "BAL" or balance position, thereby activating the voltage divider network. Load control knob 22 is then adjusted to its proper position, that is to low, medium or high depending upon the capacity or load rating of the battery being tested. Thereafter, the master or timer switch 23 is closed to its 12-volt testing position. If both halves of the battery are in good operating condition, the load imposed on the battery will be shared equally by all cells and the needle will remain in or close to its null position. However, if the cell is not in good condition, the voltage produced by the two halves will be unequal and the needle will be shifted to the right or to the left. If the shift is sufficient to throw the needle beyond the center or safe zone of scale 53, it is at once apparent to the operator and the battery owner that the battery is unreliable if not in fact unserviceable and in need of replacement. It is immaterial whether one or more cells is bad, since it is known that the battery cannot be depended upon.

It may develop that the battery appears acceptable for low loads, but that when tested for medium or for high loads, it is unserviceable, a fact ascertained by shifting the control knob 22 to the intermediate or to the right-hand position as the case may be and again closing the master control switch 23 to its 12-volt operating position. It will be understood that this switch is preferably of the time-controlled type that maintains the load circuit closed for a predetermined brief period as, for example, 10 seconds, before shifting to its open or neutral position.

If a check through full rated load shows a battery is in good condition, it is quite possible that the apparent malfunctioning of the battery is due to a maladjusted or improperly functioning voltage regulator. This fact is readily ascertained without changing the connection of the tester to the battery and by starting the vehicle engine. The operator shifts range selector switch 24 to either the 6- or 12-volt position, depending on the battery voltage under check. He then proceeds to check the regulator and to note whether indicator 20 responds properly as the engine is idled or accelerated. The high sensitivity upper scale 52 is read and note is made whether the regulator shows the proper voltages as specified for that vehicle and regulator at different engine operating speeds.

It may be pointed out in closing that load resistors are preferably selected to provide a high battery load of 125 amperes for a 6-volt battery or 300 amperes for a 12-volt battery; a low load of 75 amperes for a 6-volt battery and 100 amperes for a 12-volt battery; and a medium load of 100 amperes for a 6-volt battery or 200 amperes for a 12-volt battery.

While the particular tester for storage batteries and voltage regulators herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A go no-go battery tester for testing the operability of a storage battery under load conditions, said tester comprising, differential voltage indicator means provided with go no-go indicator means, probe means insertable into electrolyte in the midsection of said battery and in circuit with said indicator means, means for applying a selected one of several different size loads to a battery under test, adjustable high-sensitivity electrical means connected in circuit across the battery terminals and including connections with said probe means and with said differential voltage indicator means for adjusting the latter means to the null position thereof without load on the individual battery under test, and means operable after making said null position adjustment for applying a selected load to the battery whereby an operator observing said voltage indicator means can determine whether the load on the battery is being shared equally by each end half of the battery and, if not, whether the disparity is within or outside the go no-go capabilities of that battery.

2. A battery tester as defined in claim 1 characterized in that said adjustable electrical means includes voltage divider means adapted to be connected across the terminals of the battery under test and having an adjustable contact connected to one terminal of said voltage indicator means.

3. A battery tester as defined in claim 1 characterized in that said probe means includes a plurality of conductive probes electrically interconnected in parallel and positioned for simultaneous insertion into the electrolyte of adjacent cells between the terminal cells of a battery having an even number of cells in excess of three thereby to facilitate measuring the voltage drop to either remote side of said probe means.

4. A battery tester as defined in claim 1 characterized in the provision of manually adjustable circuit means connected with said voltage indicator means for changing the sensitivity of the indicator means whereby the same is usable while connected to a vehicle battery to indicate to a mechanic when the vehicle voltage regulator is properly adjusted.

5. A battery tester as defined in claim 4 characterized in that said manually adjustable circuit means for changing the sensitivity of said voltage indicator means includes a plurality of Zener diodes and an adjustable resistor in circuit with each diode together selectively usable depending on the voltage of the battery under test.

6. A battery tester as defined in claim 1 characterized in that said probe means includes a carbon rod having an end insertable into the battery electrolyte through the charging port for electrolyte.

7. A battery tester as defined in claim 1 characterized in that said probe means is formed of nonmetallic material immune to galvanic action in the presence of electrolyte.

8. A battery tester as defined in claim 7 characterized in that said probe means includes a plurality of nonmetallic members electrically connected and including common support means holding the same adjusted selectably in different spaced-apart relation appropriate for insertion through the electrolyte-charging openings of adjacent cells of batteries of different cell size.

9. A battery tester as defined in claim 3 characterized in that said tester includes a main housing, and said different size loads comprising a plurality of electrical load resistors mounted on protective supports rigidly attached to said tester and arranged in spaced-apart generally vertical positions along an upright wall of said casing and exposed to atmospheric cooling air.

10. A battery tester as defined in claim 6 characterized in that said probe means includes a resilient shroud encircling the same and having one end secured to a portion of said probe means remote from a free end of the latter, said shroud being normally extended to embrace the end of the probe insertable into the electrolyte and being readily contractable lengthwise of said probe means as the end of the latter is being inserted into a battery cell filling opening.

11. A battery tester as defined in claim 7 characterized in that said probe means includes a resilient shroud embracing one end thereof and readily contractable to expose the end portion of the probe means as the latter is inserted into a battery cell through the cell filling opening, said shroud being effective to protect the probe means against contact with foreign matter and safeguarding against the wet probe contacting the operator or his clothing after being withdrawn from a battery cell.

12. A battery tester as defined in claim 8 characterized in that each of said nonmetallic members is enshrouded with a resilient bellowslike sleeve having a normal length substantially embracing the sides of said members along the portion thereof insertable into the electrolyte of a battery cell, said bellowslike sleeve being collapsible to expose the ends of said members as the latter are inserted through a cell filling opening into the electrolyte and being extendable as the probe members are withdrawn thereby to provide a dry protective shroud sleeve surrounding the wet probe members and safeguarding the same against contact with other objects while the electrolyte thereon is drying.